(12) United States Patent
Krisak

(10) Patent No.: US 12,720,326 B2
(45) Date of Patent: Aug. 25, 2026

(54) DATA INTEGRITY AUDITING AND CORRECTION TOOL FOR CELLULAR NETWORK DEPLOYMENT

(71) Applicant: Boost SubscriberCo L.L.C., Englewood, CO (US)

(72) Inventor: Daniel Krisak, Denver, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 313 days.

(21) Appl. No.: 18/525,483

(22) Filed: Nov. 30, 2023

(65) Prior Publication Data

US 2025/0142353 A1 May 1, 2025

Related U.S. Application Data

(60) Provisional application No. 63/593,898, filed on Oct. 27, 2023.

(51) Int. Cl.
*H04W 16/18* (2009.01)
*H04W 48/16* (2009.01)

(52) U.S. Cl.
CPC ........... *H04W 16/18* (2013.01); *H04W 48/16* (2013.01)

(58) Field of Classification Search
CPC ..... H04W 16/18; H04W 48/16; H04W 24/02; H04W 76/11; H04W 64/00; H04W 4/029; H04W 4/16; H04W 64/006; H04W 24/08; H04W 16/14; H04B 17/27; H04B 17/26; H04L 63/10; H04L 41/0853
See application file for complete search history.

(56) References Cited

U.S. PATENT DOCUMENTS 6,336,035 B1 * 1/2002 Somoza ................ H04W 16/18
2010/0323688 A1 * 12/2010 Kazmi .................. H04W 24/02
2012/0163235 A1 * 6/2012 Ho ........................ H04W 76/11
2016/0337177 A1 * 11/2016 Lindoff ................. H04W 16/18
2017/0290075 A1 * 10/2017 Carbajal ............... H04W 24/08
2017/0374573 A1 * 12/2017 Kleinbeck ............. H04W 16/14
2022/0225224 A1 * 7/2022 SHi ....................... H04W 48/16
2023/0300009 A1 * 9/2023 Li .......................... H04L 41/08

* cited by examiner

*Primary Examiner* — Lana N Le
(74) *Attorney, Agent, or Firm* — Seed Intellectual Property Law Group LLP

(57) ABSTRACT

System and methods for improving data integrity in development and deployment of a cellular network. Expected configuration information for new cells being added to the cellular network is stored. A radio frequency planning tool receives user-provided configuration information for a target cell being added to the cellular network. A first set of user-provided configuration information for the target cell is extracted from the received user-provided configuration information, and a second set of configuration information is automatically generating from the received user-provided configuration information. The first set and the second set of configuration information are compared to the expected configuration information. In response to detecting a discrepancy between the first set and the expected configuration information or between the second set and the expected configuration information, the user-provided configuration information is corrected in the radio frequency planning tool based on the discrepancy.

20 Claims, 4 Drawing Sheets

DATA INTEGRITY AUDITING AND CORRECTION TOOL FOR CELLULAR NETWORK DEPLOYMENT

BACKGROUND

Planning, configuring, building, and deploying a cellular network takes numerous people doing numerous different tasks. One task is to define and specify the hardware and wireless technologies being used. A variety of different people and components rely on these data entries. As a result, the integrity of data used to develop and deploy a cellular network is important to successful development and deployment of the network. Unfortunately, the more people and the more data entries that are needed to develop the network can cause errors. It is with respect to these and other considerations that the embodiments described herein have been made.

BRIEF SUMMARY

Briefly, embodiments described herein are directed system and methods for improving data integrity in development and deployment of a cellular network. When developing or deploying a cellular network, a user inputs user-provided configuration information for a cell being added to the network into radio frequency planning tool. The tool itself, or another computing system, extracts a first set of user-provided configuration information from the received user-provided configuration information, and generates a second set of configuration information from the received user-provided configuration information. The first set and the second set of configuration information are compared to expected configuration information that was previously stored. In response to detecting a discrepancy between the first set and the expected configuration information or between the second set and the expected configuration information, the user-provided configuration information is corrected in the radio frequency planning tool based on the discrepancy.

According to some embodiments, the technical benefits of the systems and methods described herein include improved cellular network development and deployment by reducing errors in the configuration information being used to develop and simulate the network prior to its actual deployment.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
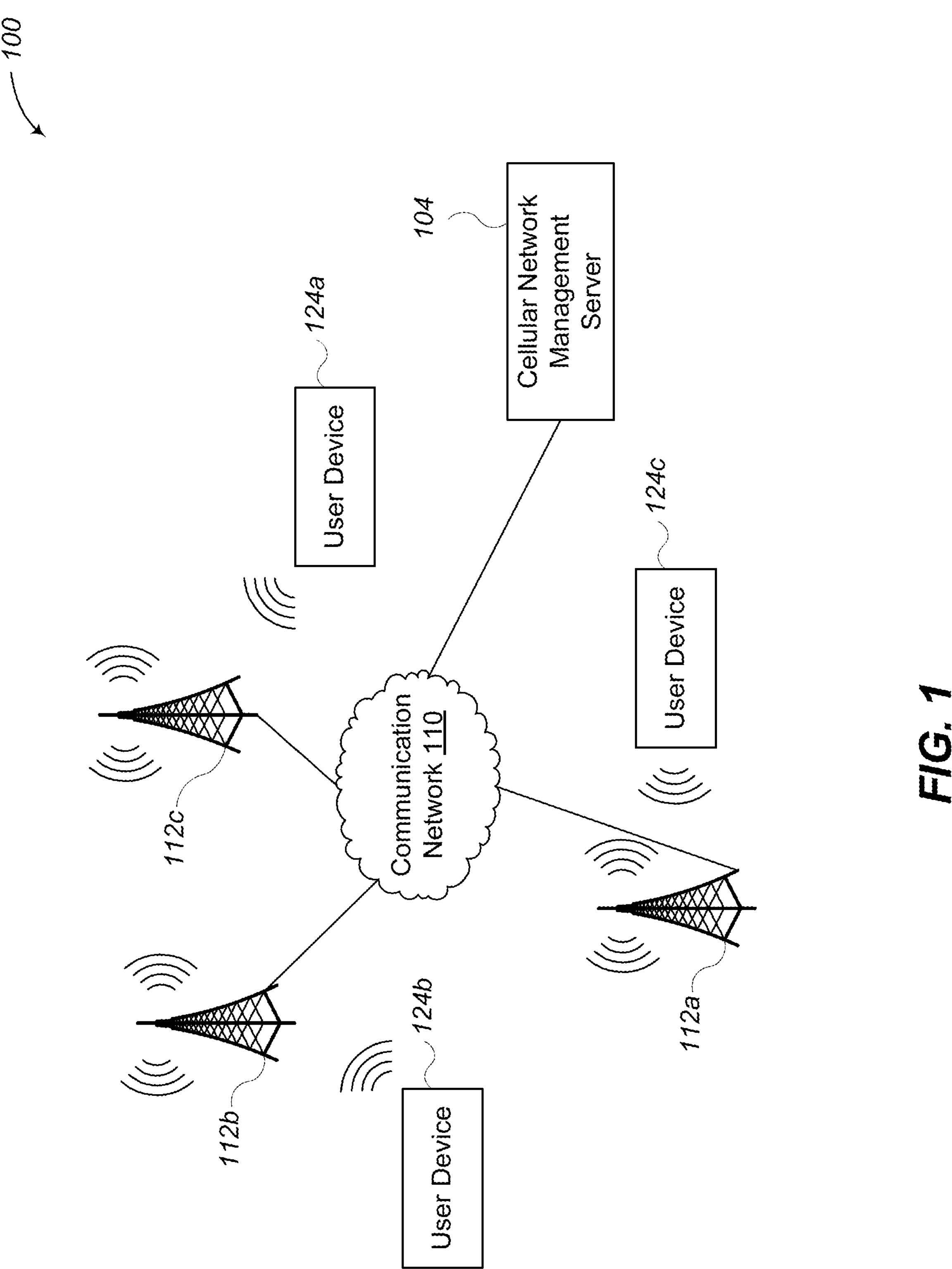
FIG. 1 illustrates a context diagram of an environment for improving data integrity for cellular network development and deployment in accordance with embodiments described herein.

FIG. 1 illustrates a context diagram of an environment 100 for improving data integrity for cellular network development and deployment in accordance with embodiments described herein. Environment 100 includes a plurality of cells 112*a*-112*c*, a plurality of user devices 124*a*-124*b*, and a cellular network management server 104, which may be in communication via a communication network 110.

The user devices 124*a*-124*c* are computing devices that receive and transmit cellular communication messages with the cells 112*a*-112*c*. Examples of user devices 124*a*-124*c* may include, but are not limited to, mobile devices, smartphones, tablets, cellular-enabled laptop computers, or other computing devices that can communication with a cellular network.

The cells 112*a*-112*c* are cellular towers that together provide the hardware infrastructure of a cellular communications network, e.g., a 5G cellular communications network. In various embodiments, the cellular communications network may be referred to as a wireless network. The cells 112*a*-112*c* may include or be in communication with base stations, radio back haul equipment, antennas, or other devices, which are not illustrated for ease of discussion.

Each cell 112 provides compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. The overall capacity of the network created by the cells 112*a*-112*c* depends on the coverage of each cell 112 and the interference that the cells 112 may have on each other, which can be measured by spectral efficiency. In various embodiments, the cells 112*a*-112*c* may communicate with each other via communication network 110. Communication network 110 includes one or more wired or wireless networks, which may include a series of smaller or private connected networks that carry information between the cells 112*a*-112*c*.

In various embodiments, a group of cells 112*a*-112*c* that make up the cellular communication network may be referred to as a "market." A market may be for a particular city, neighborhood, geographical area, or other selected or specified cluster of cells. While designing, developing, or deploying the cells 112*a*-112*c* to implement the cellular network in a market, various users, administrators, engineers, or other people may input configuration information regarding the cells 112*a*-112*c* into a radio frequency planning tool. In various embodiments, the configuration information may include a Customer Information Questionnaire (CIQ). The CIQ is a standard in the cellular industry and includes information that is pertinent to the design process of a cellular network, which may be obtained from the customer/operator or other persons associated with the development and deployment of the cellular network. The configuration information may include any information regarding the cells and how they are to be used or implemented in the cellular communication network. Such configuration information may include, but is not limited to, cell hardware, cell identifiers, cell location, cell height, tilt and azimuth of the radio of the cell, cell coverage area, base station (or gNodeB) servicing the cell, cell capabilities, details regarding virtualized network functions, etc. In some embodiments, the configuration information is manually input into the radio frequency planning tool. In other embodiments, the radio frequency planning tool may obtain or collect the configuration information from other computer systems, computing tools, or documents.

The cellular network management server 104 is configured to perform embodiments described herein to improve data integrity for cellular network development and deployment. In various embodiments, the cellular network management server 104 stores expected configuration information for cells already in or being added to the cellular network. The cellular network management server 104 then receives, collects, or obtains user-provided configuration information in a radio frequency planning tool. From this user-provided configuration information, two separate and distinct sets of configuration information are determined. A first set of user-provided configuration information is extracted from the user-provided configuration information. This first set of user-provided configuration information includes exact data obtained directly from the user-provided configuration information. The second set of configuration information is generated from the user-provided configuration information, but was not directly obtained from the user-provided configuration information. This second set of configuration information is new data that is different from the user-provided configuration information. The cellular network management server 104 compares the first set and the second set of configuration information to the expected configuration. If there are any discrepancies, the cellular network management server 104 outputs or automatically corrects the discrepancy in the radio frequency planning tool.

Figure 2:
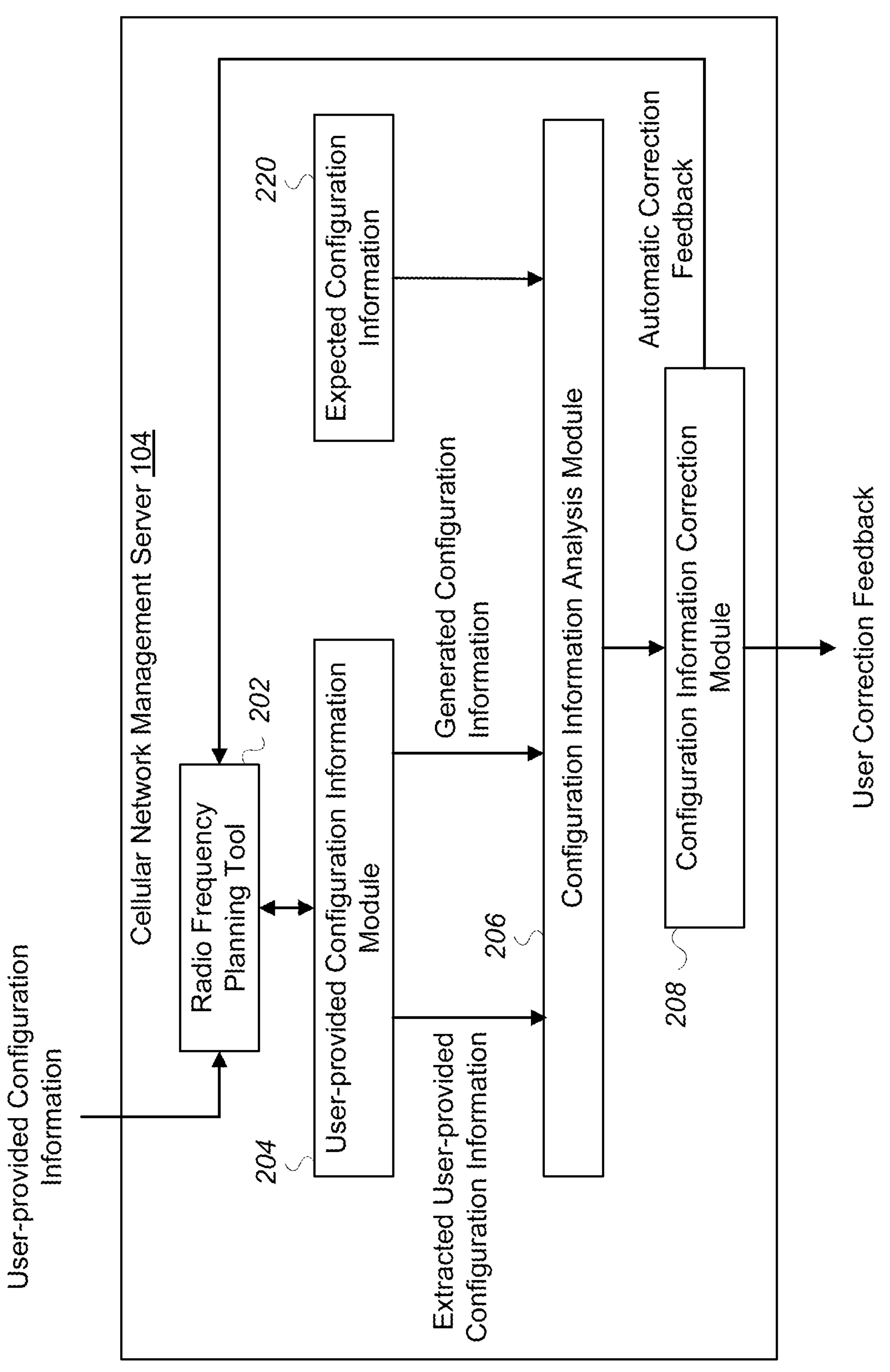
FIG. 2 is a context diagram of a non-limiting embodiment of systems that provide functionality to improve data integrity for cellular network development and deployment in accordance with embodiments described herein.

FIG. 2 is a context diagram of a non-limiting embodiment of systems that provide functionality to improve data integrity for cellular network development and deployment in accordance with embodiments described herein. FIG. 2 includes a cellular network management server 104, similar to the cellular network management server 104 in FIG. 1.

The cellular network management server 104 includes a radio frequency planning tool 202, a user-provided configuration information module 204, a configuration information analysis module 206, a configuration information correction module 208, and expected configuration information 220.

The expected configuration information 220 stores configuration information that is expected to be input into the radio frequency planning tool 202. The expected configuration information 220 may have been defined or stored by an administrator, engineer, or other user of the radio frequency planning tool 202 or the cellular network management server 104. In some embodiments, the expected configuration information 220 may include storing a known value for one or more select configuration information. In other embodiments, the expected configuration information 220 may include storing a naming convention for one or more select configuration information. In yet other embodiments, the expected configuration information 220 may include storing an expected mapping between a cell and a network cluster.

The radio frequency planning tool 202 is a software interface or software construct that tracks and manages user-provided configuration information for multiple cells of a cellular network, such as during design, development, or deployment of the cells or the network. In some embodiments, the radio frequency planning tool 202 may be used to simulate coverage areas of the network, bandwidth capabilities of the network, etc.

The user-provided configuration information module 204 accesses the user-provided configuration information in the radio frequency planning tool 202 to determine two sets of configuration information. The user-provided configuration information module 204 extracts user-provided configuration information directly from the configuration information managed by the radio frequency planning tool 202. The user-provided configuration information module 204 also generates other configuration from the user-provided configuration information managed by the radio frequency planning tool 202. This generated configuration information is not included in the radio frequency planning tool 202, but is derivable from the configuration information managed therein. For example, if the radio frequency planning tool 202 identifies specific radio hardware of a cell in the network, then the predicted coverage area of the cell can be generated based on coverage specifications for that specific radio hardware. In some embodiments, the user-provided configuration information module 204 may only extract user-provided configuration information from the user-provided configuration information, or it may only generate other configuration information from the user-provided configuration information, or it may determine both sets of information.

The configuration information analysis module 206 receives the extracted user-provided configuration information or the generated configuration information, or both, from the user-provided configuration information module 204. The configuration information analysis module 206 compares the extracted user-provided configuration information to the expected configuration information 220 to determine if there are any discrepancies. Similarly, the configuration information analysis module 206 compares the generated configuration information to the expected configuration information 220 to determine if there are any discrepancies. If there is a discrepancy, the configuration information analysis module 206 notifies the configuration a configuration information correction module 208 of the discrepancy.

The configuration information analysis module 206 may perform one or more types of comparisons between the extracted user-provided configuration information or the generated configuration information and the expected configuration information 220 depending on the type of configuration information being compared or analyzed. In some embodiments, comparing the extracted user-provided configuration information or the generated configuration information to the expected configuration information includes comparing a user-provided value to a known value stored in the expected configuration information. In other embodiments, comparing the extracted user-provided configuration information or the generated configuration information to the expected configuration information may include comparing a value generated from the user-provided configuration information to the known value stored in the expected configuration information. In yet other embodiments, comparing the extracted user-provided configuration information or the generated configuration information to the expected configuration information may include comparing a user-provided name to the stored naming convention stored in the expected configuration information. And in some embodiments, comparing the extracted user-provided configuration information or the generated configuration information to the expected configuration information may include comparing a user-provided mapping to a stored expected mapping between a cell and a network cluster.

The configuration information correction module 208 receives any identified discrepancies from the configuration information analysis module 206. The configuration information correction module 208 determines the type of discrepancy and how it can be remedied or fixed. In some embodiments, the configuration information correction module 208 provides automatic correction feedback to the radio frequency planning tool 202. In this way, the user-provided configuration information in the radio frequency planning tool 202 is automatically updated to correct the discrepancy. In other embodiments, the configuration information correction module 208 outputs user correction feedback to a user. In this way, the user can then manually input, change, or modify the user-provided configuration information in the radio frequency planning tool 202.

Although the radio frequency planning tool 202, the user-provided configuration information module 204, the configuration information analysis module 206, and the configuration information correction module 208 are illustrated separately, embodiments are not so limited. Rather, the functionality of the radio frequency planning tool 202, the user-provided configuration information module 204, the configuration information analysis module 206, and the configuration information correction module 208 may be employed as one or a plurality of computer modules or components.

The operation of certain aspects will now be described with respect to FIG. 3. In at least one of various embodiments, process 300 described in conjunction with FIG. 3 may be implemented by or executed via circuitry or on one or more computing devices, such as cellular network management server 104 in FIG. 1.

Figure 3:
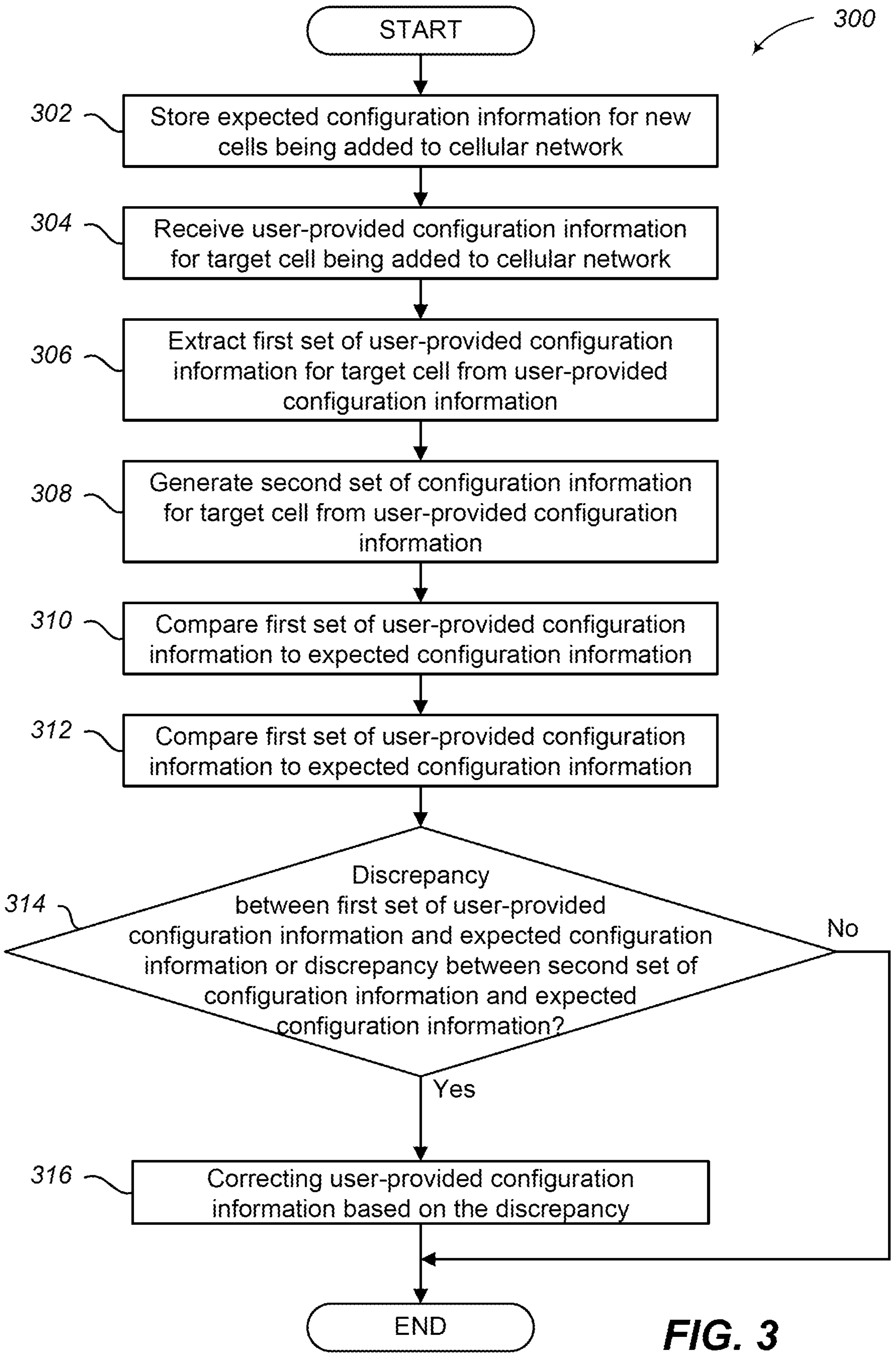
FIG. 3 illustrates a logical flow diagram showing one embodiment of a process for improving data integrity for cellular network development and deployment in accordance with embodiments described herein.

FIG. 3 illustrates a logical flow diagram showing one embodiment of a process 300 for improving data integrity for cellular network development and deployment in accordance with embodiments described herein.

Process 300 begins, after a start block, at block 302, where expected configuration information for new cells being added to a cellular network is stored. In various embodiments, a user, administrator, or engineer may enter or provide the expected configuration information for one cell or a plurality of cells being added to a particular cellular network market. In other embodiments, the expected configuration information may be obtained from one or more network specifications, network standards, or government requirements.

Process 300 proceeds after block 302 to block 304, where user-provided configuration information for a target cell being added to the cellular network is received at a radio frequency planning tool, such as radio frequency planning tool 202 in FIG. 2. In various embodiments, a user, administrator, or engineer may enter or provide the user-provided configuration information for one cell or a plurality of cells being added to a particular cellular network market.

Process 300 continues after block 304 at block 306, where a first set of user-provided configuration information for the target cell is extracted from the user-provided configuration information. In various embodiments, the first set of user-provided configuration information includes the actual information directly from the user-provided configuration information, such as an input frequency spectrum, a name of the cell, etc.

Process 300 proceeds after block 306 to block 308, where a second set of configuration information for the target cells is generated from the user-provided configuration information. Once generated, the second set of configuration information includes different information from the received user-provided configuration information. In various embodiments, the second set of generated configuration information includes the information indirectly derived from the user-provided configuration information.

Process 300 continues after block 308 at block 310, where the first set of user-provided configuration information is compared to the stored expected configuration information. In various embodiments, each user-provided configuration information in the radio frequency planning tool may be associated with a type of configuration information. The expected configuration information of the same types as the user-provided configuration information in the first set is then selected and compared to the first set of user-provided configuration information.

Process 300 proceeds after block 310 to block 312, where the second set of configuration information is compared to the stored expected configuration information. In various embodiments, each generated configuration information may be associated with a type of configuration information. The expected configuration information of the same types as the generated configuration information in the second set is then selected and compared to the second set of user-provided configuration information.

Process 300 continues after block 312 at decision block 314, where a determination is made whether there are any discrepancies between the first set of user-provided configuration information or the second set of configuration information. A discrepancy may be identified if there is a difference between one or more user-provided configuration information in the first set and the corresponding expected configuration information, or if there is a difference between one or more generated configuration information in the second set and the corresponding expected configuration information.

If there is a discrepancy between at least one user-provided configuration information in the first set of user-provided configuration compared to the expected configuration information, or if there is a discrepancy between at least one generated configuration information in the second set of provided configuration compared to the expected configuration information, or both, or any combination of discrepancies, then process 300 flows to block 316; otherwise, process 300 terminates or otherwise returns to a calling process to perform additional actions.

At block 316, user-provided information is corrected in the radio frequency planning tool based on the discrepancy or multiple discrepancies. In some embodiments, an indication of the discrepancy or discrepancies is provided to a user via a graphical user interface. In at least one such embodiment, the discrepancy or a correction to fix the discrepancy (e.g., a known or expected value), or both, is displayed to the user. For example, a flag or error marker may be set in the radio frequency planning tool to indicate a discrepancy between the user-provided configuration information shown in the radio frequency planning tool and the expected configuration information. In other embodiments, the indication of the discrepancy may be exported to a document or other system that can present discrepancies to a user.

In yet other embodiments, the radio frequency planning tool may automatically correct or fix the discrepancy. For example, if the user-provided configuration information identifies a specific radio hardware for a cell, but then identifies a radio frequency spectrum not supported by the specific radio hardware, then the radio frequency planning tool may automatically change the radio frequency spectrum to match the specific radio hardware.

Figure 4:
FIG. 4 shows a system diagram that describe various implementations of computing systems for implementing embodiments described herein.
Figure 4:
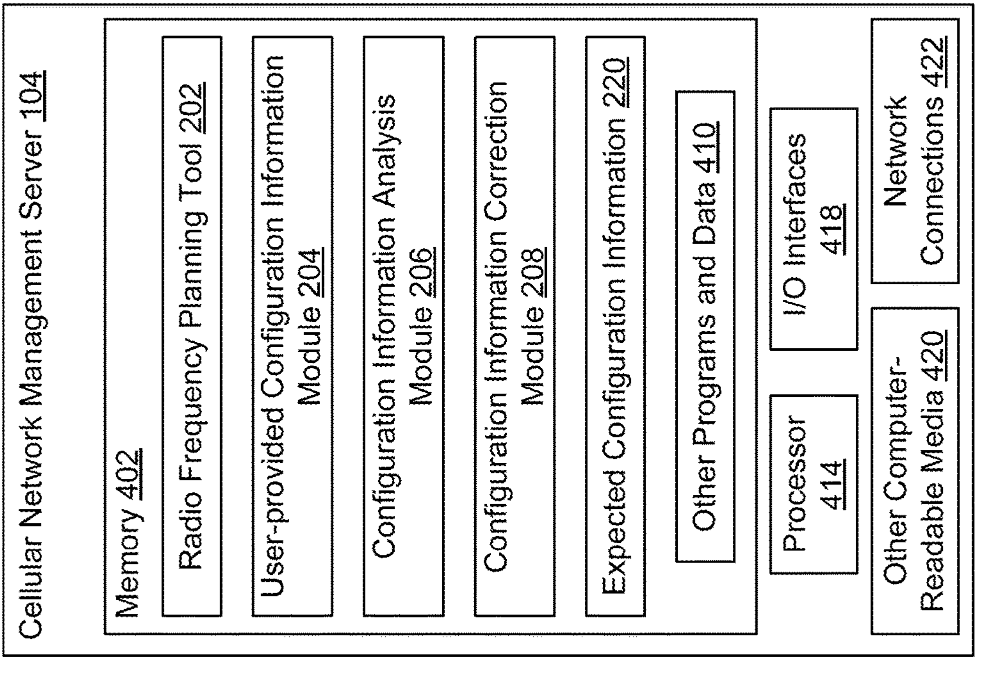

FIG. 4 shows a system diagram that describe various implementations of computing systems for implementing embodiments described herein. System 400 includes a cellular network management server 104, as described herein.

The cellular network management server 104 is a computing system or environment that analyzes user-provided configuration information managed by a radio frequency planning tool to determine if there are discrepancies between that information and expected configuration information, as described herein. One or more special-purpose computing systems may be used to implement the cellular network management server 104. Accordingly, various embodiments described herein may be implemented in software, hardware, firmware, or in some combination thereof. The cellular network management server 104 includes memory 402, processor 414, I/O interfaces 418, other computer-readable media 420, and network connections 422.

Processor 414 may include one or more central processing units, circuitry, or other computing components or units-collectively referred to as a processor-that are configured to perform embodiments described herein or to execute computer instructions to perform embodiments described herein. In some embodiments, a single processor may operate individually to perform embodiments described herein. In other embodiments, a plurality of processors may operate to collectively perform embodiments described herein, such that one or more processors may operate to perform some, but not all, of the embodiments described herein.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by processor 414 to perform actions, including embodiments described herein.

Memory 402 may have stored thereon a radio frequency planning tool 202, a user-provided configuration information module 204, a configuration information analysis module 206, a configuration information correction module 208, and expected configuration information 220, which are configured to collectively employ embodiments described herein. Memory 402 may also other programs and data 410 (e.g., operating systems, other call-related data, etc.).

Network connections 422 are configured to communicate with other computing devices, such as cells 112*a*-112*c* or a distinct computing system employing the radio frequency planning tool 202. In various embodiments, the network connections 422 include transmitters and receivers (not illustrated) to send and receive data as described herein. I/O interfaces 418 may include one or more data input or output interfaces, video or display interfaces, or other input/output interfaces. The I/O interfaces 418 enable an administrator, engineer, or user to provide expected configuration information or specific user-provided configuration information for a cell being added to a network. Other computer-readable media 420 may include other types of stationary or removable computer-readable media, such as removable flash drives, external hard drives, or the like.

The following is a summarization of the claims as originally filed.

A method may be summarized as comprising: storing, in a database, expected configuration information for new cells being added to a cellular network; receiving, at a radio frequency planning tool, user-provided configuration information for a target cell being added to the cellular network; extracting a first set of user-provided configuration information for the target cell from the received user-provided configuration information; automatically generating a second set of configuration information from the received user-provided configuration information, wherein the second set of configuration information includes different information from the received user-provided configuration information; comparing the first set of user-provided configuration information and the second set of configuration information to the expected configuration information; in response to detecting a discrepancy between the first set of user-provided configuration information and the expected configuration information or between the second set of configuration information and the expected configuration information, correcting the user-provided configuration information in the radio frequency planning tool based on the discrepancy.

The method may store the expected configuration information for new cells being added to the cellular network by storing a known value for select configuration information. And the method may compare the first set of user-provided configuration information and the second set of configuration information to the expected configuration information by comparing a user-provided value to the known value for the select configuration information.

The method may store the expected configuration information for new cells being added to the cellular network by storing a known value for select configuration information. And the method may compare the first set of user-provided configuration information and the second set of configuration information to the expected configuration information by comparing a value generated from the user-provided configuration information to the known value for the select configuration information.

The method may store the expected configuration information for new cells being added to the cellular network by storing a naming convention for select configuration information. And the method may compare the first set of user-provided configuration information and the second set of configuration information to the expected configuration information by comparing a user-provided name to the stored naming convention for the select configuration information.

The method may store the expected configuration information for new cells being added to the cellular network by storing an expected mapping between the target cell and a network cluster. And the method may compare the first set of user-provided configuration information and the second set of configuration information to the expected configuration information by comparing a user-provided mapping to the stored expected mapping between the target cell and the network cluster.

The method may correct the user-provided configuration information based on the discrepancy by providing an indication of the discrepancy to a user.

The method may correct the user-provided configuration information based on the discrepancy by automatically changing the user-provided configuration information to fix the discrepancy in the radio frequency planning tool.

The method may predicting coverage of the cellular network based on the user-provided configuration information.

A system may be summarized as comprising: a memory configured to store computer instructions and expected configuration information for new cells being added to a cellular network; and a processor configured to execute the computer instructions to: receive, in a radio frequency planning tool, user-provided configuration information for a target cell being added to the cellular network; extract a first set of user-provided configuration information for the target cell from the received user-provided configuration information; generate a second set of configuration information from the received user-provided configuration information wherein the second set of configuration information includes different information from the received user-provided configuration information; compare the first set of user-provided configuration information and the second set of configuration information to the expected configuration information; in response to detecting a discrepancy between the first set of user-provided configuration information and the expected configuration information or between the second set of configuration information and the expected configuration information, correct the user-provided configuration information in the radio frequency planning tool based on the discrepancy.

The expected configuration information for new cells being added to the cellular network may include a known value for select configuration information. And the processor of the system may compare the first set of user-provided configuration information and the second set of configuration information to the expected configuration information by being configured to further execute the computer instructions to compare a user-provided value to the known value for the select configuration information.

The expected configuration information for new cells being added to the cellular network may include a known value for select configuration information. And the processor of the system may compare the first set of user-provided configuration information and the second set of configuration information to the expected configuration information by being configured to further execute the computer instructions to compare a value generated from the user-provided configuration information to the known value for the select configuration information.

The expected configuration information for new cells being added to the cellular network may include a naming convention for select configuration information. And the processor of the system may compare the first set of user-provided configuration information and the second set of configuration information to the expected configuration information by being configured to further execute the computer instructions to compare a user-provided name to the stored naming convention for the select configuration information.

The expected configuration information for new cells being added to the cellular network may include an expected mapping between the target cell and a network cluster. And the processor of the system may compare the first set of user-provided configuration information and the second set of configuration information to the expected configuration information by being configured to further execute the computer instructions to compare a user-provided mapping to the stored expected mapping between the target cell and the network cluster.

The processor of the system may correct the user-provided configuration information based on the discrepancy by being configured to further execute the computer instructions to provide an indication of the discrepancy to a user.

The processor of the system may correct the user-provided configuration information based on the discrepancy by being configured to further execute the computer instructions to automatically change the user-provided configuration information to fix the discrepancy in the radio frequency planning tool.

The processor of the system may be configured to further execute the computer instructions to predict coverage of the cellular network based on the user-provided configuration information.

A non-transitory computer-readable medium may be summarized as storing computer instructions that, when executed by at least one processor, cause the at least one processor to perform actions. The actions comprising: storing, in a database, expected configuration information for new cells being added to a wireless network; receiving, at a radio frequency planning tool, user-provided configuration information for a target cell being added to the wireless network; extracting a first set of configuration information for the target cell from the received user-provided configuration information; generating a second set of configuration information from the received user-provided configuration information, wherein the second set of configuration information includes different information from the received user-provided configuration information; comparing the first set of user-provided configuration information and the second set of configuration information to the expected configuration information; in response to detecting a discrepancy between the first set of user-provided configuration information and the expected configuration information or between the second set of configuration information and the expected configuration information, correcting the user-provided configuration information in the radio frequency planning tool based on the discrepancy.

The computer instructions of the non-transitory computer-readable medium, when executed by the at least one processor, may cause the at least one processor to perform further actions, the further actions may comprise: wherein storing the expected configuration information for new cells being added to the wireless network includes storing a known value for select configuration information; and wherein comparing the first set of user-provided configuration information and the second set of user-provided configuration information to the expected configuration information includes comparing a user-provided value to the known value for the select configuration information.

The computer instructions of the non-transitory computer-readable medium, when executed by the at least one processor, cause the at least one processor to perform further actions, the further actions comprising: wherein storing the expected configuration information for new cells being added to the wireless network includes storing a known value for select configuration information; and wherein comparing the first set of user-provided configuration information and the second set of configuration information to the expected configuration information includes comparing a value generated from the user-provided configuration information to the known value for the select configuration information.

The computer instructions of the non-transitory computer-readable medium, when executed by the at least one processor to correct the user-provided configuration information based on the discrepancy, cause the at least one processor to perform further actions, the further actions comprising: providing an indication of the discrepancy to a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
- storing, in a database, expected configuration information for new cells being added to a cellular network;
- receiving, at a radio frequency planning tool, user-provided configuration information for a target cell being added to the cellular network;
- extracting a first set of user-provided configuration information for the target cell from the received user-provided configuration information;
- automatically generating a second set of configuration information from the received user-provided configuration information, wherein the second set of configuration information includes different information from the received user-provided configuration information;
- comparing the first set of user-provided configuration information to the expected configuration information;
- comparing the second set of configuration information to the expected configuration information; and
- in response to detecting a discrepancy between the first set of user-provided configuration information and the expected configuration information or a discrepancy between the second set of configuration information and the expected configuration information, correcting the user-provided configuration information in the radio frequency planning tool based on the discrepancy.

2. The method of claim 1, further comprising:
- wherein storing the expected configuration information for new cells being added to the cellular network includes storing a known value for select configuration information; and
- wherein comparing the first set of user-provided configuration information and the second set of configuration information to the expected configuration information includes comparing a user-provided value to the known value for the select configuration information.

3. The method of claim 1, further comprising:
- wherein storing the expected configuration information for new cells being added to the cellular network includes storing a known value for select configuration information; and
- wherein comparing the first set of user-provided configuration information and the second set of configuration information to the expected configuration information includes comparing a value generated from the user-provided configuration information to the known value for the select configuration information.

4. The method of claim 1, further comprising:
- wherein storing the expected configuration information for new cells being added to the cellular network includes storing a naming convention for select configuration information; and
- wherein comparing the first set of user-provided configuration information and the second set of configuration information to the expected configuration information includes comparing a user-provided name to the stored naming convention for the select configuration information.

5. The method of claim 1, further comprising:
- wherein storing the expected configuration information for new cells being added to the cellular network includes storing an expected mapping between the target cell and a network cluster; and
- wherein comparing the first set of user-provided configuration information and the second set of configuration information to the expected configuration information includes comparing a user-provided mapping to the stored expected mapping between the target cell and the network cluster.

6. The method of claim 1, wherein correcting the user-provided configuration information based on the discrepancy comprises:
- providing an indication of the discrepancy to a user.

7. The method of claim 1, wherein correcting the user-provided configuration information based on the discrepancy comprises:
- automatically changing the user-provided configuration information to fix the discrepancy in the radio frequency planning tool.

8. The method of claim 1, further comprising:
- predicting coverage of the cellular network based on the user-provided configuration information.

9. A system, comprising:
- a memory configured to store computer instructions and expected configuration information for new cells being added to a cellular network; and
- a processor configured to execute the computer instructions to:

receive, in a radio frequency planning tool, user-provided configuration information for a target cell being added to the cellular network;

extract a first set of user-provided configuration information for the target cell from the received user-provided configuration information;

generate a second set of configuration information from the received user-provided configuration information wherein the second set of configuration information includes different information from the received user-provided configuration information;

compare the first set of user-provided configuration information to the expected configuration information;

compare the second set of configuration information to the expected configuration information; and in response to detecting a discrepancy between the first set of user-provided configuration information and the expected configuration information or a discrepancy between the second set of configuration information and the expected configuration information, correct the user-provided configuration information in the radio frequency planning tool based on the discrepancy.

10. The system of claim 9, wherein the expected configuration information for new cells being added to the cellular network includes a known value for select configuration information, and wherein the processor compares the first set of user-provided configuration information and the second set of configuration information to the expected configuration information by being configured to further execute the computer instructions to compare a user-provided value to the known value for the select configuration information.

11. The system of claim 9, wherein the expected configuration information for new cells being added to the cellular network includes a known value for select configuration information, and wherein the processor compares the first set of user-provided configuration information and the second set of configuration information to the expected configuration information by being configured to further execute the computer instructions to compare a value generated from the user-provided configuration information to the known value for the select configuration information.

12. The system of claim 9, wherein the expected configuration information for new cells being added to the cellular network includes a naming convention for select configuration information, and wherein the processor compares the first set of user-provided configuration information and the second set of configuration information to the expected configuration information by being configured to further execute the computer instructions to compare a user-provided name to the stored naming convention for the select configuration information.

13. The system of claim 9, wherein the expected configuration information for new cells being added to the cellular network includes an expected mapping between the target cell and a network cluster, and wherein the processor compares the first set of user-provided configuration information and the second set of configuration information to the expected configuration information by being configured to further execute the computer instructions to compare a user-provided mapping to the stored expected mapping between the target cell and the network cluster.

14. The system of claim 9, wherein the processor corrects the user-provided configuration information based on the discrepancy by being configured to further execute the computer instructions to:

provide an indication of the discrepancy to a user.

15. The system of claim 9, wherein the processor corrects the user-provided configuration information based on the discrepancy by being configured to further execute the computer instructions to:

automatically change the user-provided configuration information to fix the discrepancy in the radio frequency planning tool.

16. The system of claim 9, wherein the processor is configured to further execute the computer instructions to:

predict coverage of the cellular network based on the user-provided configuration information.

17. A non-transitory computer-readable medium storing computer instructions that, when executed by at least one processor, cause the at least one processor to perform actions, the actions comprising:

storing, in a database, expected configuration information for new cells being added to a wireless network;

receiving, at a radio frequency planning tool, user-provided configuration information for a target cell being added to the wireless network;

extracting a first set of configuration information for the target cell from the received user-provided configuration information;

generating a second set of configuration information from the received user-provided configuration information, wherein the second set of configuration information includes different information from the received user-provided configuration information;

comparing the first set of user-provided configuration information to the expected configuration information;

comparing the second set of configuration information to the expected configuration information; and in response to detecting a discrepancy between the first set of user-provided configuration information and the expected configuration information or a discrepancy between the second set of configuration information and the expected configuration information, correcting the user-provided configuration information in the radio frequency planning tool based on the discrepancy.

18. The non-transitory computer-readable medium of claim 17, wherein the computer instructions, when executed by the at least one processor, cause the at least one processor to perform further actions, the further actions comprising:

wherein storing the expected configuration information for new cells being added to the wireless network includes storing a known value for select configuration information; and wherein comparing the first set of user-provided configuration information and the second set of user-provided configuration information to the expected configuration information includes comparing a user-provided value to the known value for the select configuration information.

19. The non-transitory computer-readable medium of claim 17, wherein the computer instructions, when executed by the at least one processor, cause the at least one processor to perform further actions, the further actions comprising:

wherein storing the expected configuration information for new cells being added to the wireless network includes storing a known value for select configuration information; and wherein comparing the first set of user-provided configuration information and the second set of configuration information to the expected configuration information includes comparing a value generated from the user-provided configuration information to the known value for the select configuration information.

20. The non-transitory computer-readable medium of claim 17, wherein the computer instructions, when executed by the at least one processor to correct the user-provided configuration information based on the discrepancy, cause the at least one processor to perform further actions, the further actions comprising:

providing an indication of the discrepancy to a user.

* * * * *